June 20, 1967 G. ATTALI 3,327,203
INDUCTION LOGGING SYSTEM UTILIZING PLURAL DIAMETER COILS
Filed Dec. 4, 1963 3 Sheets-Sheet 1
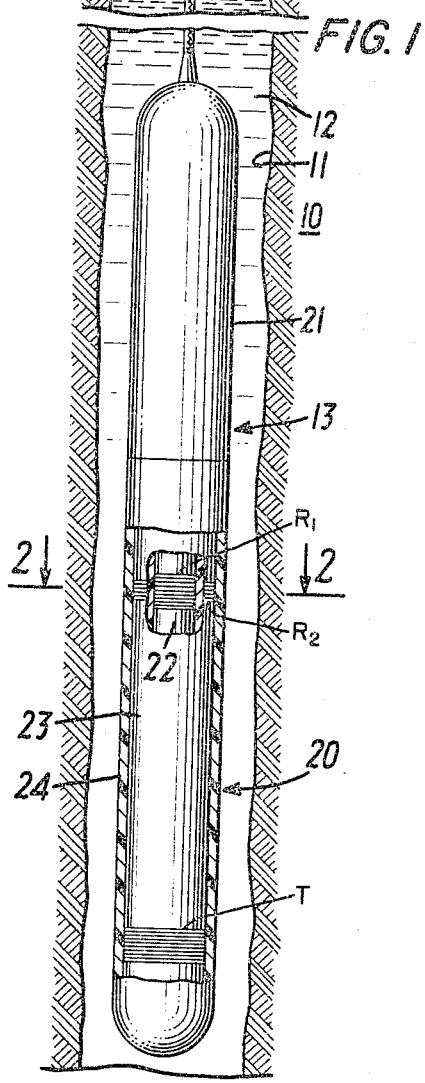
FIG. 1
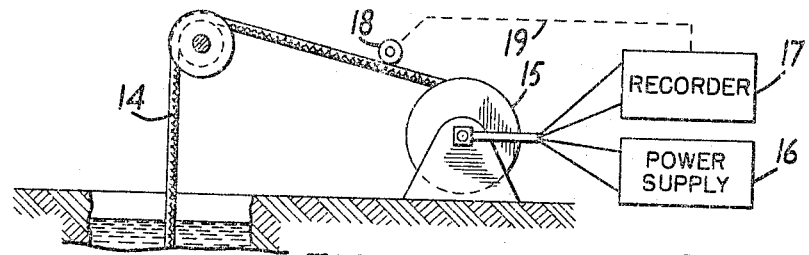
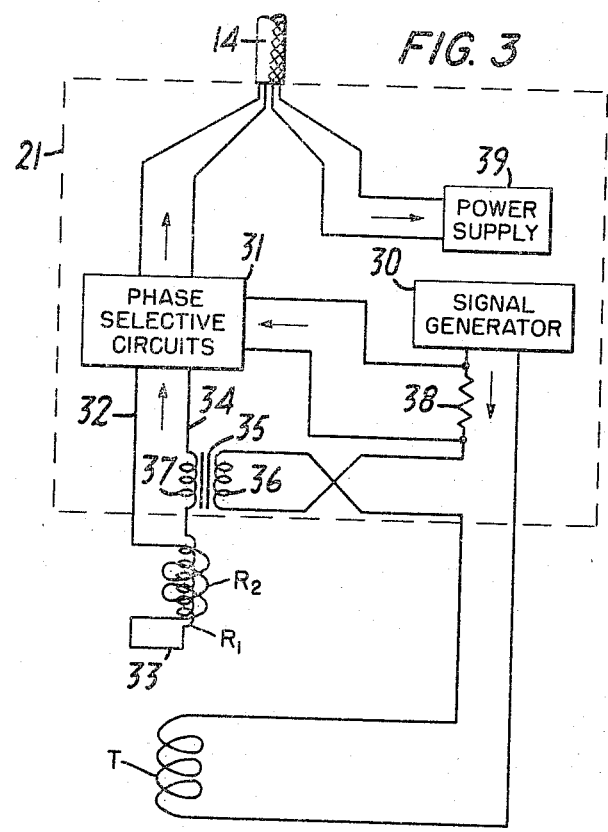
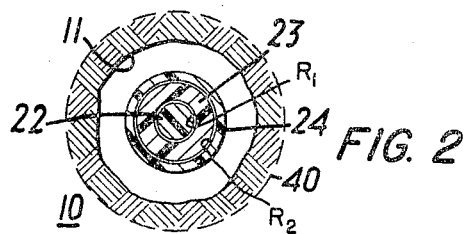
FIG. 2
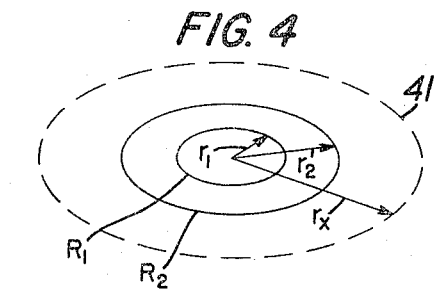
INVENTOR.
GEORGES ATTALI
BY
Richard E. Bee
his ATTORNEY

INVENTOR.
GEORGES ATTALI

BY Richard E. Bee his ATTORNEY

INVENTOR.
GEORGES ATTALI

United States Patent Office 3,327,203
Patented June 20, 1967

3,327,203
INDUCTION LOGGING SYSTEM UTILIZING
PLURAL DIAMETER COILS
Georges Attali, Ridgefield, Conn., assignor, by mesne assignments, to Schlumberger Technology Corporation, Houston, Tex., a corporation of Texas
Filed Dec. 4, 1963, Ser. No. 327,892
7 Claims. (Cl. 324—6)

This invention relates to apparatus for investigating subsurface earth formations traversed by a borehole drilled into the earth and, particularly, to such apparatus of the electromagnetic induction type.

It has been heretofore proposed to utilize a system of iduction coils for logging or measuring the electrical characteristics of subsurface earth formations penetrated by a borehole. Such measurements are useful in determining the presence and depth of hydrocarbon-bearing zones (oil, gas, etc.) that may exist in the subsurface earth formations. In making such measurements, it is usually desirable that the volume of earth material which is measured by the coil system at any given moment be of a particular size and location relative to the coil system. In particular, it is usually desirable that the coil system measure only a relatively short vertical thickness of the formation material at any given instant. It is also frequently desired that the measurements not be affected by the material in an immediately adjacent the borehole itself. In order to accomplish these purposes, various so-called "focussed" coil systems have been heretofore proposed. These focussed systems utilize various auxiliary or focussing coils, in addition to the primary measuring coils, for cancelling or minimizing signal components from undesired regions about the coil system.

It is an object of the invention to provide new and improved induction logging apparatus for investigating earth formations traversed by a borehole.

It is another object of the invention to provide new and improved logging apparatus which provides an additional degree of freedom in obtaining desired focussing effects.

It is a further object of the invention to provide new and improved induction logging apparatus which provides improved compensation for undesired effects of the borehole itself.

In accordance with the invention, induction logging apparatus for investigating earth formations traversed by a borehole comprises a coil system adapted for movement through the borehole and including at least two concentric coils and a third coil longitudinally spaced from the concentric coils. A first circuit connects the two concentric coils in opposed relation and a second circuit is connected to the third coil, an energizing source being connected to one of these circuits and a signal detector to the other.

For a better understanding of the present invention, together with other and further objects thereof, reference is had to the following description taken in connection with the accompanying drawings, the scope of the invention being pointed out in the appended claims.

Referring to the drawings:

FIG. 1 is a view in elevation, partly broken away, showing a representative embodiment of induction logging apparatus constructed in accordance with the present invention;

FIG. 2 is a cross-sectional view taken along the section line 2—2 of FIG. 1;

FIG. 3 is a schematic circuit diagram for a portion of the FIG. 1 apparatus;

FIG. 4 is a diagrammatic representation of a coil system used in explaining the present invention;

Figure 5:
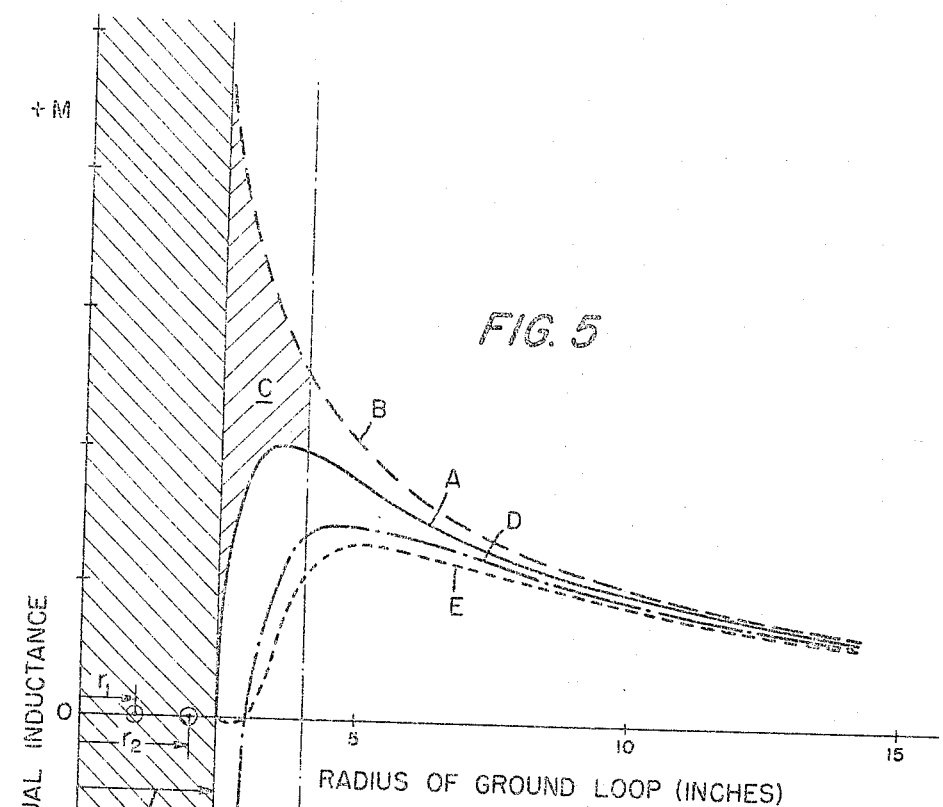
FIG. 5 is a graph used in explaining the FIG. 1 embodiment.

Referring to FIG. 1 of the drawings, there is shown induction logging apparatus for investigating earth formations 10 traversed by a borehole 11. The borehole 11 is filled with a conductive drilling fluid or drilling mud 12. The induction logging apparatus includes a downhole instrument 13 which is suspended in the borehole 11 by means of an armored multiconductor cable 14. Movement of the downhole instrument 13 is controlled by a drum and winch mechanism 15 located at the surface of the earth. Electrical power for the downhole instrument is provided by a power supply 16 located at the surface and connected thereto by way of appropriate conductors in the cable 14. Signals generated by the downhole instrument 13 are recorded by a recorder 17 located at the surface, these signals being supplied thereto by way of appropriate conductors in the cable 14. The recording film in the recorder 17 is advanced in synchronism with the movement of the downhole instrument 13 by means of a wheel 18 which engages the cable 14 and an appropriate mechanical linkage indicated by dash line 19.

The downhole instrument 13, which is of an elongated cylindrical shape, includes an elongated support section 20 for supporting a coil system and a fluid-tight housing 21 for containing various electrical circuits for operating the coil system. The coil support section 20 includes an inner cylindrical support member 22, an intermediate cylindrical support member 23, and an outer cylindrical sleeve member 24. The concentric nature of these support members is indicated in the cross-sectional view of FIG. 2. Each of these members 22, 23, and 24 is composed of a non-conductive, non-magnetic material such as, for example, a cloth-reinforced plastic material.

The coil system secured to the support section 20 includes a transmitter coil T and a receiver coil $R_2$ which is longitudinally spaced apart therefrom. Each of the coils T and $R_2$ is constructed of several turns of insulated conductor wire which is wound around the outer surface of the intermediate support member 23. The coil system also includes an auxiliary receiver coil $R_1$ located in close proximity to the first receiver coil $R_2$. The auxiliary coil $R_1$ is concentric with the receiver coil $R_2$ but is of a different diameter than the receiver coil $R_2$. In particular, the auxiliary coil $R_1$ is constructed of several turns of insulated conductor wire which is wound around the outer surface of the inner support member 22. As indicated in FIG. 1, this auxiliary receiver coil $R_1$ is located inside of the receiver coil $R_2$ and at the same longitudinal location in the support section 20 as the receiver coil $R_2$.

Referring to FIG. 3, there is shown in a schematic manner the downhole electrical circuits for operating the coil system. These circuits, which are contained within the fluid-tight housing 21 of FIG. 1, include a signal generator 30 for supplying energizing current to the transmitter coil T. This energizing current is an alternating current of constant peak amplitude and having a frequency of, for example, 20 kilocycles per second. The two receiver coils $R_1$ and $R_2$ are connected in a series-opposing manner with one another by a conductor 33 and are connected by two conductors 32 and 34 to the input terminals of a signal detecting means represented by phase selective circuits 31. Circuits 31 may, for example, be of the type described in the United States patent to Doll, No. 2,788,483 for "Phase Rejection Networks." An additional voltage component is also added in serices with the receiver coils $R_1$ and $R_2$ by means of a transformer 35 having a primary winding 36 connected in series in the transmitter coil circuit and a secondary winding 37 connected in series in the receiver coil circuit. A phase reference signal developed across a resistor 38 in the transmitter coil circuit is supplied to a second input of the phase selective circuits 31 and the output of phase selective circuits 31 is connected to the recorder 17 at the surface of the earth by means of insulated conductors contained within the cable 14. In a similar manner, a downhole power supply 39 is connected to the power supply 16 at the surface of the earth by way of additional conductors in the cable 14, the power supply connections from the downhole power supply 39 to the signal generator 30 and the phase selective circuits 31 having been omitted from the drawings for sake of simplicity.

Considering now the operation of the apparatus thus far described, as the downhole instrument 13 is moved through the borehole 11, the signal generator 30 operates to energize the transmitter coil T with alternating current. The resulting electromagnetic field surrounding the transmitter coil T serves to induce a current flow in the earth formation material adjacent to the borehole 11, the magnitude of which is proportional to the conductivity of the formation material. This induced current flow in circle paths or loops which are generally concentric with the longitudinal axis of the borehole 11. A typical current flow line is indicated by the dash line 40 of FIG. 2. Where the drilling mud 12 contained in the borehole 11 is of a conductive nature, as is frequently the case, some induced current also flows in such drilling mud 12. Each element or elemental loop of this induced current flow serves to induce voltage components in the receiver coils $R_1$ and $R_2$ which are proportional to the magnitude of such elemental current and, hence, which are proportional to the conductivity of the material through which such elemental current is flowing. The receiver coil voltage components resulting from such induced current flow bear an in-phase relationship with respect to the current flowing in the transmitter coil T.

Since there is, in addition to the above-described linkage between the transmitter T and the receiver coils $R_1$ and $R_2$ by way of the current induced in the formation, a direct flux coupling between the transmitter coil and the receiver coils, there are also induced in the receiver coils additional voltage components resulting from such direct flux coupling. These direct coupling components are of constant magnitude and bear a quadrature-phase relationship with respect to the transmitter coil current. Consequently, the transformer 35 may be arranged so that any net direct coupling voltage components induced in the series-connected receiver coils $R_1$ and $R_2$ are largely cancelled by an opposite-polarity quadrature-phase component which is added in series with those coils by the transformer 35.

The remaining receiver coil voltage is supplied to the phase selective circuits 31. Under the control of the phase reference signal developed across the resistor 38, the phase selective circuits 31 operate to detect and pass only voltage components which are "in phase" with the transmitter coil current. Thus, the signal appearing at the output of phase selective circuits 31 is proportional to the net signal induced in the receiver coils $R_1$ and $R_2$ by the currents flowing in the borehole and adjacent earth materials. This output signal is supplied by way of conductors in the cable 14 to the recorder 17 located at the surface of the earth so that the recorder 17 provides a permanent record of such signal as a function of the depth of the instrument 13 in the borehole 11.

In accordance with the present invention, the pair of receiver coils $R_1$ and $R_2$ of different diameters is utilized to provide a focussing action whereby signal components resulting from current flow induced in the drilling mud 12 are minimized. This focussing action will be explained with the aid of the diagramatic representation of FIG. 4, wherein the receiver coils $R_1$ and $R_2$ are represented as coplanar loops of radii $r_1$ and $r_2$, respectively. Assume for the moment that a circular element of current, represented by a dash line 41, is flowing at a radius $r_x$ and in the same plane with coils $R_1$ and $R_2$. Then, for any given value of $r_x$, it is possible, by properly choosing the relative number of turns on the two receiver coils $R_1$ and $R_2$, to cause equal voltages to be induced in these two receiver coils. If these receiver coils are connected series opposing, then no net voltage will result across the series combination due to current flow at the selected radius.

This phenomena is made use of in the present embodiment in order to minimize the response of the coil system to material in the borehole 11. In other words, a radius at which zero response is desired is selected and the numbers of turns on the receiver coils $R_1$ and $R_2$ are proportioned relative to one another so as to provide zero net response to any current flowing at this radius. In the present embodiment, this radius for zero response is located in the interval between the outer surface of the sleeve member 24 and the wall of the borehole 11.

A quantitative determination of the effects of coil diameters and number of coil turns can be made by evaluating the mutual inductances between the various coils and the current flow loop or loops of interest. In effect, a current flow loop, such as the loop 41 in FIG. 4, constitutes a single turn coil of radius $r_x$. Various formulas are known for evaluating the mutual inductance between a pair of parallel coaxial coils. A satisfactory formula is given in Terman's Radio Engineers' Handbook, first edition, McGraw-Hill Book Company, 1943, pages 67–73. This formula is of the form:

$$M = 2.54 K N_a N_b r_a r_b \quad (1)$$

where M is the mutual inductance, $r_a$ is the radius of one of the coils, $r_b$ is the radius of the other coil, $N_a$ is the number of turns on the first coil and $N_b$ is the number of turns on the other coil. K is a factor which is a function of the radii $r_a$ and $r_b$. A table of values for evaluating this K factor is given in Terman.

In order to produce equal signal voltages in the two receiver coils $R_1$ and $R_2$, it is necessary that the mutual inductance between each of these coils and the selected current loop be the same. Mathematically:

$$M_{1x} - M_{2x} = 0 \quad (2)$$

where $M_{1x}$ is the mutual inductance between the coil $R_1$ and the current loop or ground loop of radius $r_x$ and $M_{2x}$ is the mutual inductance between the $R_2$ coil and the same ground loop at radius $r_x$. Using the Equation 1 relationship to evaluate the mutual inductance of Equation 2, a solution can be made for the ratio $N_1/N_2$, where $N_1$ is the number of turns on the $R_1$ coil and $N_2$ is the number of turns on the $R_2$ coil, for the selected value of $r_1$, $r_2$, and $r_x$, the latter being the radius at which zero response is desired.

The absolute number of turns for each of the coils $R_1$ and $R_2$ is selected to provide a desired voltage magnitude or voltage sensitivity for currents flowing at relatively large radial distances from the center axis of the coil system. This can be done in a convenient manner by specifying that the net voltage produced across the series-connected receiver coils $R_1$ and $R_2$ should be equal to the voltage produced across an equivalent single coil of predetermined dimension by a current loop of large radius compared to $r_1$ and $r_2$. In other words:

$$V_1 - V_2 = V_s \qquad (3)$$

where $V_1$ and $V_2$ are the actual coil voltage components and $V_s$ is the voltage component for the equivalent coil. From known mutual inductance theory, these voltages can be evaluated in terms of the coil turns and coil radii so that the relationship of Equation 3 may be rewritten as:

$$N_1 r_1^2 - N_2 r_2^2 = N_s r_s^2 \qquad (4)$$

where $N_s$ and $r_s$ are the number of turns and the radius for the selected equivalent coil. The use of Equation 4 provides a method whereby the net sensitivity of the two coils $R_1$ and $R_2$ may be evaluated in terms of the sensitivity of an equivalent single coil. This is useful both for design purposes and purposes of comparison.

Having determined the number of coil turns and the coil radii, it is then possible to evaluate the effects of current loops or ground loops of different radii on the chosen coil system. For example, if the radius of receiver coil $R_1$ is selected to be 1.0 inches and the radius of receiver coil $R_2$ is selected to be 2.0 inches and if it is desired that these two coils should produce zero net response to a current loop or ground loop having a radius of 2.5 inches, then the ratio of $N_1/N_2$ is approximately 5.5. If it is desired that the combination of receiver coils $R_1$ and $R_2$ should have the same sensitivity as a single receiver coil of ten turns and having a radius of 1.4 inches, then it is found that this condition is satisfied if $N_1$ is equal to 71 turns and $N_2$ is equal to 13 turns.

Using the foregoing values for the numbers of coil turns and coil radii, the net effect of ground loops of different radii on this system may be evaluated by determining the net mutual inductance between such ground loops and the two receiver coils $R_1$ and $R_2$. The numerical results of this evaluation are plotted in FIG. 5 as curve A. As indicated by curve A, a net mutual inductance of zero is provided at a radius of 2.5 inches. In the present embodiment, it is assumed that this radius of 2.5 inches corresponds to the radius of the outer surface of the sleeve member 24, which surface defines the outer limits of the body of the instrument 13 or the coil support structure 20. The borehole 11 is assumed to have a nominal radius of 4.0 inches.

Since curve A does not remain at zero over the entire interval between the outer surface of the instrument body and the wall of the borehole 11, this means that some signal will be produced in the receiver coils by some of the material in the borehole 11. The response of curve A, however, represents a considerable improvement over that obtained for the case of a single receiver coil. This is seen by comparing curve A with curve B. Curve B is the response curve for the equivalent single coil having ten turns and a radius of 1.4 inches. As is indicated by the shaded area C, the undesired borehole response is reduced by a factor of approximately 50% for the case of the pair of receiver coils as compared to a single receiver coil of equivalent sensitivity.

It is possible to go further and produce even greater improvement. If, for example, the numbers of coil turns for coils $R_1$ and $R_2$ are recalculated so that zero net response will occur for a ground loop radius of 3.0 inches, then the response for ground loops of other radii are indicated by curve D of FIG. 5. In this case, $N_1$ is equal to approximately 129 turns, while $N_2$ is equal to approximately 27 turns. The significant feature of curve D is that the net response is negative over part of the undesired borehole interval and positive over the remainder of the undesired borehole interval. For the case of zero response at 3.0 inches, these negative and positive responses (the negative and positive areas under curve D) approximately cancel one another. This means that, for uniform current flow, there will be no net response from the material in the borehole.

If the diameter of the borehole should change somewhat, then this cancellation may not remain complete. It does, however, afford a substantial improvement over other methods heretofore proposed. In particular, since the two coils $R_1$ and $R_2$ which are providing the compensation are at the same vertical location along the coil support structure, no errors will be introduced because of differences in borehole diameter at different vertical locations along the coil support means.

Figure 6:
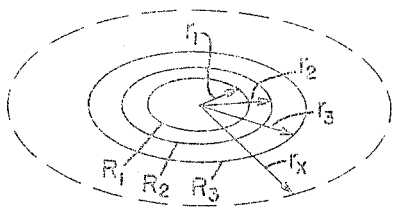
FIG. 6 is a diagrammatic representation of another embodiment of a coil system.

The present invention is not limited to the case where the different coils at the same vertical location are equal to two in number. In fact, further improvement can be obtained where additional coils of different diameters are positioned at the same vertical location along the coil support means. A case of this type is indicated diagrammatically in FIG. 6, where three receiver coils $R_1$, $R_2$, and $R_3$ of different diameters are assumed to be positioned at the same vertical location. Curve E of FIG. 5 represents the response for a three-coil system of this type where the radius $r_1$ is 1.0 inch, the radius $r_2$ is 1.4 inches, the radius $r_3$ is 2.0 inches, and the two ground loop radii for zero response are selected to be 2.5 and 3.0 inches. In this case, the coil $R_2$ is connected in a series-opposing manner and the coil $R_3$ is connected in a series-aiding manner with respect to the coil $R_1$. In general, where more than two receiver coils are used, zero responses may be provided at more than one radius.

Figure 7:
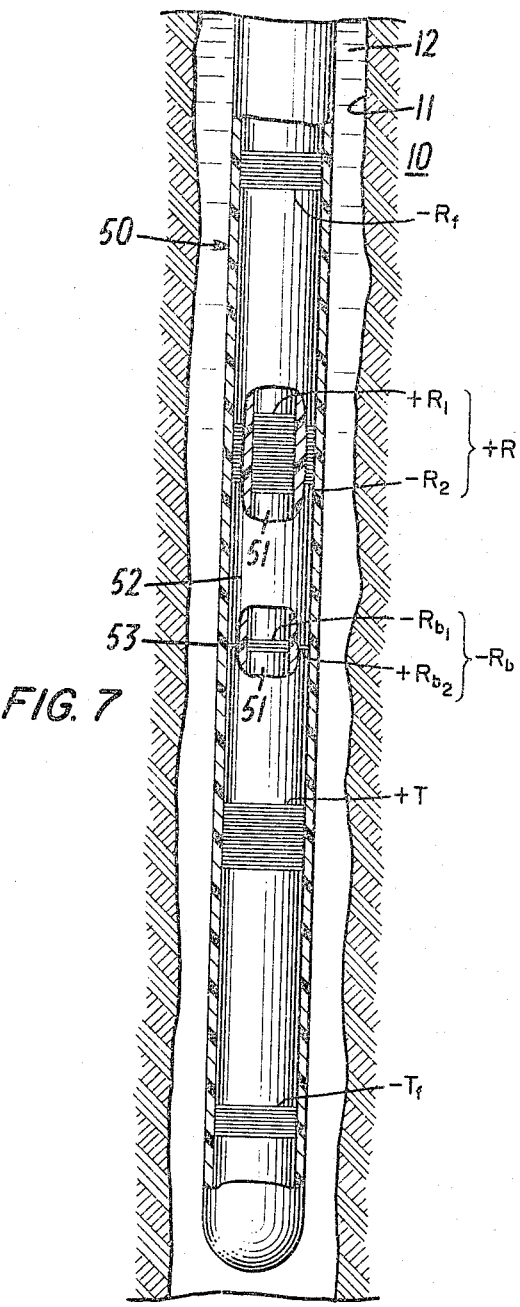
FIG. 7 shows a further embodiment of a coil system utilizing the present invention.

Referring now to FIG. 7 of the drawings, there is shown a further embodiment of an induction logging coil system constructed in accordance with the present invention. For simplicity, only the lower portion of the downhole instrument is shown. As seen in FIG. 7, this lower portion comprises a coil support structure 50 which includes as inner support member 51, an intermediate support member 52 and an outer sleeve member 53, each being of a cylindrical shape and of a size such that they may fit inside of one another. A plurality of vertically spaced transmitter coils $+T_f$ and $-T_f$ and a plurality of vertically spaced receiver coils $-R_f$, $-R_2$, and $+R_{b2}$ are individually wound around the intermediate support member 52. A pair of vertically spaced receiver coils $+R_1$ and $-R_{b1}$ are individually wound around the inner support member 51. All of the receiver coils are connected in series with one another and with the input of suitable phase selective circuits, plus and minus signs indicating the relative polarities of the coils. Similarly, the transmitter coils are connected in series with one another and with the circuit that supplies the energizing current, the plus and minus signs indicating the relative polarities.

Receiver coils $+R_1$ and $-R_2$ are positioned in a concentric manner at the same vertical location along the support structure 50 and can be considered as representing a composite receiver coil $+R$. Likewise, receiver coils $-R_{b1}$ and $+R_{b2}$ are positioned in a concentric manner at a common longitudinal location and can be considered as constituting a composite receiver coil $-R_b$.

The coil system of FIG. 7 is similar to certain focussed coil systems which have been heretofore proposed except that, in the present case, what were formerly single receiver coils $+R$ and $-R_b$ have, in each instance, been replaced by a pair of receiver coils of different diameters. In terms of the former systems, $+R$ and $+T$ were the primary coils and $-R_f$ and $-T_f$ were focussing coils for providing a vertical focussing action, while $-R_b$ was a compensating or bucking coil for cancelling out direct flux coupling components.

In accordance with the present invention, the sensitivity to borehole materials in the immediate vicinity of the receiver coils $+R$ and $-R_b$ is considerably reduced by replacing each of the single $+R$ and $-R_b$ coils by a pair of coils of different diameters. These diameters together with the numbers of turns of the two coils in each pair are constructed to minimize the net responses to such borehole materials.

Up to this point, the invention has been described and illustrated in connection with receiver coils. It should be noted, however, that the present invention is equally applicable to transmitter coils. In particular, it will sometimes be desirable to replace a single transmitter coil by two or more transmitter coils of different diameters in the same manner as described above with respect to receiver coils. In this case, the object is to construct the transmitter coils at the same vertical location in such a manner that no net current flow will be induced at a predetermined radius from the center axis of the coil support means. The basic considerations involved in this construction are the same as before, namely, the mutual inductances between the individual transmitter coils and the ground loop for which it is desired that no current should flow. As an example of how this technique may be applied, the single transmitter coil T of FIG. 1 could be replaced by a pair of concentric transmitter coils of different diameters. This would offer further improvement in reducing the sensitivity of the coil system as a whole to the presence of the material contained within the borehole.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In induction logging apparatus for investigating earth formations traversed by a borehole, the combination comprising:
    a coil system adapted for movement through the borehole including at least two concentric coil means and a third coil means longitudinally spaced therefrom, the third coil means being of the same diameter as the larger of the two concentric coil means;
    first circuit means connecting said two coil means in opposed relation;
    second circuit means connected to the third coil means;
    energizing means connected in one of said first and second circuit means for energizing the corresponding coil means;
    and detecting means connected in the other of said first and second circuit means for detecting signals induced in the corresponding coil means.

2. In induction logging apparatus for investigating earth formations traversed by a borehole, the combination comprising:
    a coil system adapted for movement through the borehole including a pair of concentric coil means and another coil means longitudinally spaced therefrom and having the same diameter as the larger of the pair of concentric coil means, said pair of concentric coil means being arranged to provide, when connected in opposed relation, cancellation at a selected distance from their center which is greater than the radius of either of the coil means;
    first circuit means connecting said pair of coil means in opposed relation;
    second circuit means connected to the other coil means;
    energizing means connected in one of said first and second circuit means for energizing the corresponding coil means;
    and detecting means connected in the other of said first and second circuit means for detecting signals induced in the corresponding coil means.

3. In induction logging apparatus for investigating earth formations traversed by a borehole, the combination comprising:
    elongated support means adapted for movement longitudinally through the borehole;
    a pair of coil means of different diameter mounted concentrically on the support means;
    another coil means mounted on the support means in longitudinally spaced relation to the pair of coil means and having the same diameter as the larger of the pair of coil means;
    first circuit means connecting said pair of coil means in opposed relation;
    second circuit means connected to the other coil means;
    energizing means connected in one of said first and second circuit means for energizing the corresponding coil means;
    and detecting means connected in the other of said first and second circuit means for detecting signals induced in the corresponding coil means.

4. In induction logging apparatus for investigating earth formations traversed by a borehole, the combination comprising:
    a coil system adapted for movement through the borehole including at least two concentric coil means and a third coil means longitudinally spaced therefrom;
    first circuit means connecting said two coil means in opposed relation;
    second circuit means connected to the third coil means;
    energizing means connected in one of said first and second circuit means for energizing the corresponding coil means;
    detecting means connected in the other of said first and second circuit means for detecting signals induced in the corresponding coil means;
    and coupling means linking the first and second circuit means to impart to the detecting means a signal tending to cancel signals induced directly in the coil means in the circuit means including the detecting means by the coil means in the circuit means including the energizing means.

5. In induction logging apparatus for investigating earth formations traversed by a borehole, the combination comprising:
    a coil system adapted for movement through the borehole including at least three coaxial coils of different diameters with the larger encircling the smaller and a fourth coil longitudinally spaced therefrom;
    first circuit means connecting said three coils so that one is in opposed relation to the other two;
    second circuit means connected to the fourth coil;
    energizing means connected in one of said first and second circuit means for energizing the corresponding coil or coils;
    and detecting means connected in the other of said first and second circuit means for detecting signals induced in the corresponding coil or coils.

6. In induction logging apparatus for investigating earth formations traversed by a borehole, the combination comprising:
    a coil system adapted for movement through the borehole including longitudinally spaced transmitter coil means and receiver coil means, the transmitter coil means including two longitudinally spaced coils connected in opposed relation and the receiver coil means including two longitudinally spaced coils connected in opposed relation, one of said coil means including at least two coaxial coils of different diameters with one coil encircling the other and connected in opposed relation;

energizing means connected to the transmitter coil means to produce a magnetic field;

and detector means connected to the receiver coil means to detect signals induced in the receiver coil means.

7. Induction logging apparatus according to claim 6 including compensating coil means interposed longitudinally between the transmitter coil means and the receiver coil means and including two coaxial coils of different diameters with one coil encircling the other and connected in opposed relation.

References Cited

UNITED STATES PATENTS

| | | | |
|---|---|---|---|
| 2,220,070 | 11/1940 | Aiken | 324—6 |
| 2,451,596 | 11/1948 | Wheeler | 324—3 |
| 2,582,314 | 1/1952 | Doll | 324—6 |
| 3,051,892 | 8/1962 | Huston | 324—6 |

WALTER L. CARLSON, *Primary Examiner.*

G. R. STRECKER, *Assistant Examiner.*